July 27, 1937.  H. PELPHREY  2,087,957
GEAR CHECKING DEVICE
Filed Dec. 4, 1933  2 Sheets-Sheet 1
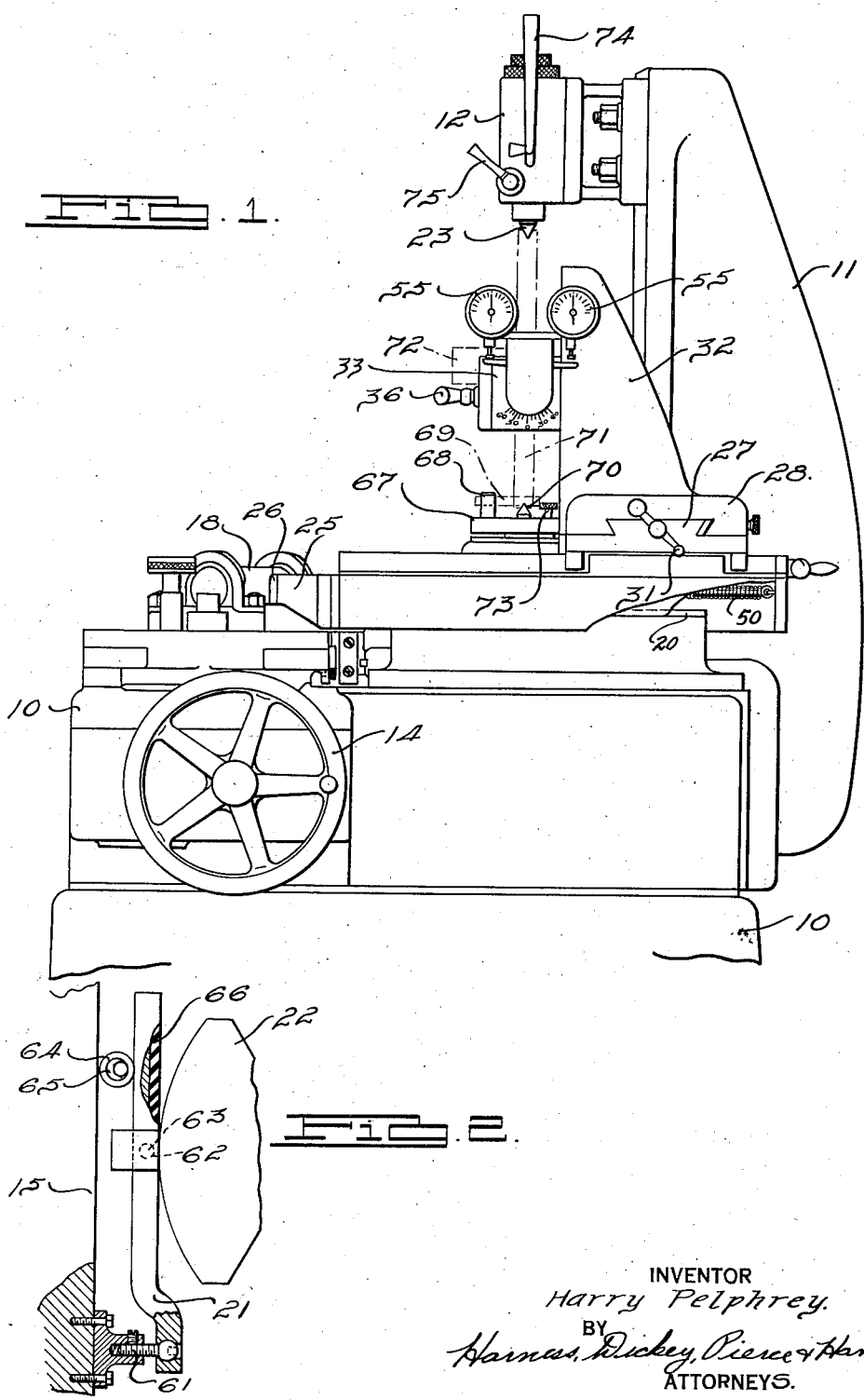
INVENTOR
Harry Pelphrey.
BY
Harness, Dickey, Pierce & Hann.
ATTORNEYS.

July 27, 1937. H. PELPHREY 2,087,957
GEAR CHECKING DEVICE
Filed Dec. 4, 1933 2 Sheets-Sheet 2
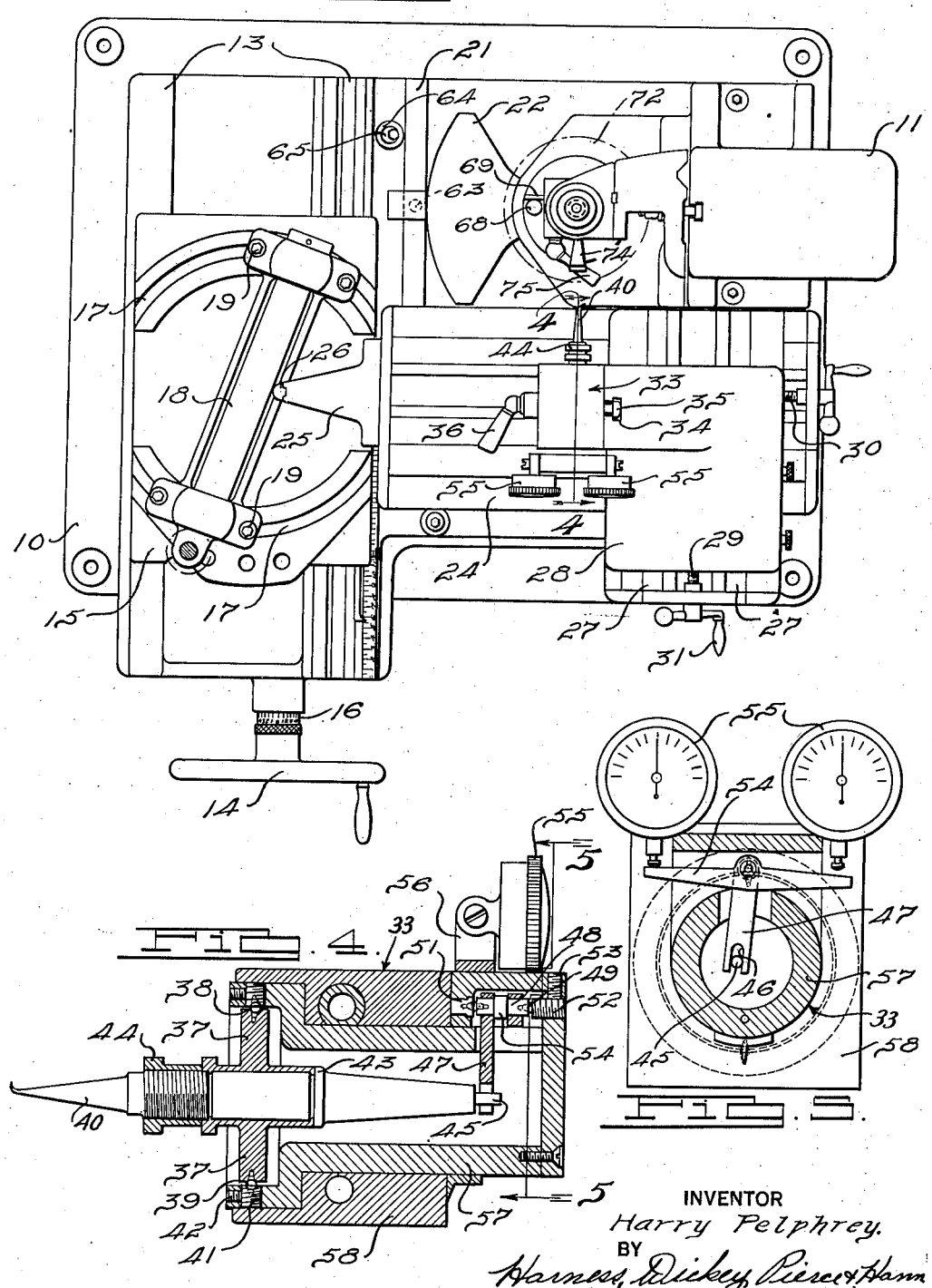
INVENTOR
Harry Pelphrey.
BY
Harness, Dickey, Pierce & Ham
ATTORNEYS.

Patented July 27, 1937

2,087,957

UNITED STATES PATENT OFFICE 2,087,957

GEAR CHECKING DEVICE

Harry Pelphrey, Detroit, Mich., assignor, by mesne assignments, to Michigan Tool Company, a corporation of Delaware Application December 4, 1933, Serial No. 700,785

9 Claims. (Cl. 33—174)

My invention relates to a device for testing the involute form of gear teeth and particularly to a machine which will accurately check the involute form of teeth of gears, worms, worm wheels and the like.

Heretofore it has been difficult to accurately check the involute form of teeth of gears because of the peculiar nature of the form, being that described by a point on a line as the line is tilted along the arc of a circle. To attain accuracy in the device applicant has eliminated all back lash and play between the parts which move in synchronism and rotate the gear and move the indicating device to effect the accurate checking. This is effected by employing a sine-bar to move the carriage which supports the indicating device, the means for moving the sine-bar also rotating the gear to be checked in synchronism with the movement of the indicating device. It is, therefore, only necessary to move the support for the sine-bar to actuate the entire device to accurately check the involute form of the gear teeth.

Accordingly, the main objects of my invention are: to provide a checking device having a movable table which effects the rotation of the gear and the movement of the indicating device in synchronism with each other; to provide a movable table with a sine-bar for moving the carriage supporting the indicating device across the gear at the time the gear is rotated by the sine-bar support; to mount a gear to be tested on a master base circle which is rotated by the movement of a device which effects the movement of an indicating device in synchronism with the rotation of the base circle of the gear; to provide an indicating device for checking the involute form which may be adjusted at any angle conforming to the helix angle of a gear to be tested, or the angle of thread of a worm, so that the involute form can be checked along a normal to the axis of the thread or tooth; and, in general, to provide an involute checking device which is simple in construction, positive in operation and accurate in recording the tooth form.

Other objects and features of novelty of my invention will be either specifically pointed out or will become apparent when referring, for a better understanding of my invention, to the following description taken in conjunction with the accompanying drawings, wherein:

Figure 1 is a broken view in elevation of a checking device embodying features of my invention, Fig. 2 is an enlarged broken view of the master base circle and actuating device therefor employed in the device illustrated in Fig. 1, Fig. 3 is a plan view of the structure illustrated in Fig. 1, Fig. 4 is an enlarged sectional view of the structure illustrated in Fig. 3 taken on the line 4—4 thereof, and Fig. 5 is a sectional view of the structure illustrated in Fig. 4, taken on the line 5—5 thereof.

In the present invention, I employ a master base circle for rotating a gear to be tested and employ a table for operating the master circle. An indicating device is supported on a carriage which is actuated by the table to move the device in synchronism with the movement of the gear. The table has a sine-bar thereon which may be adjusted so that the ratio between the movement of the table and carriage is in direct proportion to the ratio between the master circle and the base circle of the gear to be tested. It is, therefore, only necessary to adjust the sine-bar to produce a movement of the carriage in proportion to the ratio between the base circle of the gear and the master base circle to set the machine to test any size of gear.

Referring to Figs. 1, 2 and 3 I have illustrated the machine as comprising a base 10 having an upwardly projecting column 11 carrying an adjustable center 12. Ways 13 are provided on one end of the frame 10 upon which a table 15 is movable, being actuated in the usual manner by a lead screw, not shown, operated by a hand wheel 14. The back lash between the driving of the lead screw by the hand wheel 14 and the table 15 is preferably eliminated so that the scale 16 may be employed for positioning the table. However, if any back lash does appear in the lead screw operated by the hand wheel 14, this will in no way affect the accurate operation of the device. The table 15 has arcuate ways 17 thereon by which a sine-bar 18 is mounted, being secured thereon by bolts 19 in such manner that the sine-bar may be adjusted angularly upon the table 15. The table 15 also carries a bar 21 which is pressed against an element 22 defining a portion of a master base circle, the center of which is aligned with the center 23 of the adjustable center head 12.

A pair of ways 20 is provided on the base 10 perpendicular to the ways 13 upon which a carriage 24 is mounted for movement at right angles to the table 15. The carriage is provided with a driving head 25 preferably having a hardened end 26 which contacts with the side of the sine-bar 18 when biased by a spring 50 toward the sine-bar.

In this manner, the carriage 24 is always urged toward the sine-bar and is retained with the end 26 in contact therewith. Through the movement of the table 15, the carriage 24 is moved a proportional amount depending upon the angular position of the sine-bar 18. A slide 27 is provided on the carriage 24 movable parallel with the carriage and a slide 28 is mounted on the slide 27 for movement at right angles to the carriage 24. A lead screw 30 actuates the slide 27 while a lead screw 29 is employed to position the slide 28 operated by a hand wheel 31. An upwardly projecting post 32 forms a portion of the slide 28 upon which an indicating device 33 is mounted. A T shaped groove 34 is provided in the post 32 in which the head of a bolt 35 registers and which extends laterally through the indicating device 33 engaged by a clamping handle 36 by which the indicating device is secured in height relative to the post 32. By shifting the slides 27 and 28 the indicating device may be positioned relative to a tooth of a gear to be tested.

In referring to Figs. 4 and 5, I have illustrated the indicating device as having a stylus 40 mounted in a set of trunnions 37 which are pivoted on bearings 38 mounted in the bearing seats 41 which are retained in adjusted position by the set screws 42. The stylus 40 has a shoulder 43 thereon and is locked in place relative to the trunnions by a collar 44. In this manner the stylus 40 may be turned in any position to have a protruding end thereof project in any desirable direction. The trunnions 37 are positioned medially of the ends of the stylus which terminates in a cylindrical finger 45 which engages a slot 46 in an arm 47 which is mounted on a shaft 48. The shaft is secured on the ball bearings 49 one of which is journaled in the bearing seat 51, the other of which is positioned in the threaded bearing seat 52 and locked therein by a set screw 53. A bar 54 is mounted on the shaft 48 extending either side thereof to engage the stem of the indicating devices 55 mounted on a projecting boss 56 on the top of the device. It will be noted that the entire device is mounted in a cylindrical housing 57 which is retained in the shouldered block 58 for the purpose of having the entire device rotatable relative to the supporting block 58. The entire device may be rotated to have the stylus 40 traverse a spiral thread in accordance with the lead angle of the thread, so that the device may check helical gears as well as the thread of worms.

In Fig. 2, I have illustrated an enlarged view of bar 21 employed for operating the element 22 containing a portion of a master base circle, the bar being adjustable on one end through the screw 61, the opposite end having balls 62 and 63 on the bottom and top respectively for positioning the bar in a horizontal plane. A ball bearing race 64 presses against the bar 21 on the side opposite to the element 22 and is mounted on an eccentric support 65 which may be adjusted to urge the bar toward the master base circle. The center of the bar may be slotted and provided with a frictional material 66 which will be forced against the arcuate surface of the element 22 and prevent any slippage occurring therebetween. When the eccentric support 65 is adjusted to move the bar inwardly, the screw 61 on the opposite end of the bar may be adjusted to retain the bar in parallel relation to the direction of movement of the table 15.

A driving plate 67 is mounted on top of the element 22 having a projecting lug 68 which operates a dog 69 mounted on the shaft 71 upon which a gear 72 to be tested is mounted. A clamping screw 73 is secured to the driving plate 67 for securing the plate to the master base circle to be operated therewith. The screw 73 may be loosened so that the gear may be indexed to have another tooth brought into engagement with the stylus 40 on the base circle of the gear with sufficient force to deflect the hand of one of the instruments 55. The nut 73 is then tightened to lock the driving plate 67 to the element 22.

In the operation of the machine, the gear 72 is secured to the shaft 71 and mounted between the centers 23 and 70 with the dog 69 in engagement with the driving pin 68 on the driving head 67. The sine-bar is set at such an angle, as pointed out hereinabove, as to move the carriage 24 relative to the movement of the table 15 in accordance with the ratio between the base circle of the gear 72 to be tested and the master base circle defined by the element 22. The driving head 67 is adjusted to have the tooth to be tested in engagement with the stylus 40 directly on the base circle of the gear through the operation of the slides 27 and 28. The screw 73 is then tightened to clamp the driving head 67 relative to the element 22 and the indicating device 55 is then set to zero reading. The hand wheel 14 is then operated to drive the table 15 which rotates the element 22 and, therefore, the gear 72 and also moves the carriage 24 to move the indicating device relative to the speed of rotation of the gear. The stylus 40 will follow the rotation of the tooth as the gear rotates to check the tooth from the base circle outwardly to the crown thereof. If the tooth is of true involute form no movement of the indicating arm will occur while any inaccuracies will be recorded. The principle of the checking follows the rack principle of constructing involute forms of teeth which is the simplest and most correct method for laying out involute teeth forms on the circular gears.

As pointed out hereinabove, when the gear is provided with teeth disposed at an angle to the indicating device, the cylinder 57 is rotated in the securing housing 58 corresponding to the lead of the thread so that the stylus will operate along a line normal to the axis of the tooth. In this manner any type of tooth, whether on spur or spiral gears or the thread of a worm may have the involute form thereof checked accurately by the machine. For removing and mounting the shaft 71, a handle 74 is provided which advances or retracts the center 23 which may be clamped in position by a clamping handle 75.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. An involute testing device including, in combination, a base, a longitudinally movable table thereon; a rotatable element embodying at least a portion of a master base circle with which a gear to be tested is mounted concentric thereto and rotatable therewith, a carriage movable parallel to a tangent to an arc of said base circle, an indicating device mounted on said carriage, an element on the device engaging the tooth of a gear to be tested disposed on the base circle of the gear, and means for synchronizing the movement of the carriage relative to that of the table so that their relative speed of movements will bear the same proportion as the radii of the base circle of the gear and an arc of the master base circle.

2. An involute testing device including, in combination, a base, an element on said base embodying at least a portion of a master base circle, means for mounting a gear concentrically therewith, a carriage on said base movable in a direction parallel to a tangent to said master base circle, an indicating device carried by said carriage having the contacting point thereof disposed on the base circle of the gear to be tested, means for rotating the element and moving the table in synchronism with each other, and means for adjusting the degree of rotation of the element relative to the movement of said carriage.

3. An involute testing fixture including, in combination, a base, a table and carriage on said base movable at right angles to each other, a sine-bar carried by said table and engaged by said carriage, an element rotatable by said table embodying at least a portion of a master base circle with which a gear to be tested is concentrically mounted, means for adjusting said sine-bar to have the relative movements between the table and carriage bear the same relation as the radius of the master arc of the base circle bears to that of the base circle of the gear to be tested, and indicating means carried by said carriage and engaging the surface of a tooth of the gear to be checked.

4. A device for checking the involute form of a tooth which includes, in combination, a base, a table mountable on said base for movement thereon, an element embodying at least a portion of a master base circle rotatable by the movement of said table, a sine-bar carried by said table, a carriage movable at an angle to said first carriage having a portion contacting the sine-bar, an indicating device which is adjustable parallel with and at right angles to said carriage, a contacting element on said device which is adjustable to be positioned on the base circle of a gear to be checked and which is movable into a position to contact either side of a tooth thereof, means for moving said table to effect the rotation of the element and the gear and for moving the table in synchronism therewith to check the accuracy of the involute form on the tooth.

5. A device for checking the form of the teeth of a helical gear which includes, in combination, a base, a movable table thereon, an element embodying at least a portion of a master base circle movable thereby, an indicating device movable by said table parallel to a tangent to said circle, and means for adjusting the indicating device to a position corresponding to the helix angle of the teeth of the gear to be tested.

6. A checking device for a gear comprising a supporting member for supporting a gear to be tested; an indicating device and a carrier therefor movable in a direction parallel to a tangent to the base circle of the gear being tested, means operable to effect movement of said carrier and relative rotation between said supporting member and said carrier; and means for adjusting said operable means to vary the rate ratio between said movement and said relative rotation.

7. A checking device for a gear comprising an angularly movable base circle member; an indicating device and a carrier therefor movable in a direction parallel to a tangent to said base circle member, operating means for moving said member and said carrier in synchronized relation; and means connecting said operating means to said member and to said carrier and adjustable to vary the rate ratio between said linear and angular movements.

8. A checking device for a gear comprising supporting means for supporting a gear to be tested for angular movement about its axis; an indicating device and a carrier therefor movable in a direction parallel to a tangent to the base circle of the gear being tested, means operable to linearly move said carrier and angularly move said supporting means in timed relation; and means for adjusting said operable means to vary the rate ratio between said linear and angular movements.

9. A checking device for a gear comprising supporting means for supporting a gear to be tested for angular movement about its axis; an indicating device and a carrier therefor movable in a direction parallel to a tangent to the base circle of the gear being tested, a movable operating member; connections between said operating member and said carrier and between said operating member and said supporting means to effect timed linear and angular movements of said carrier and supporting member respectively; and means for adjusting certain of said connections to vary the rate ratio between said linear and angular movements.

HARRY PELPHREY.